UNITED STATES PATENT OFFICE.

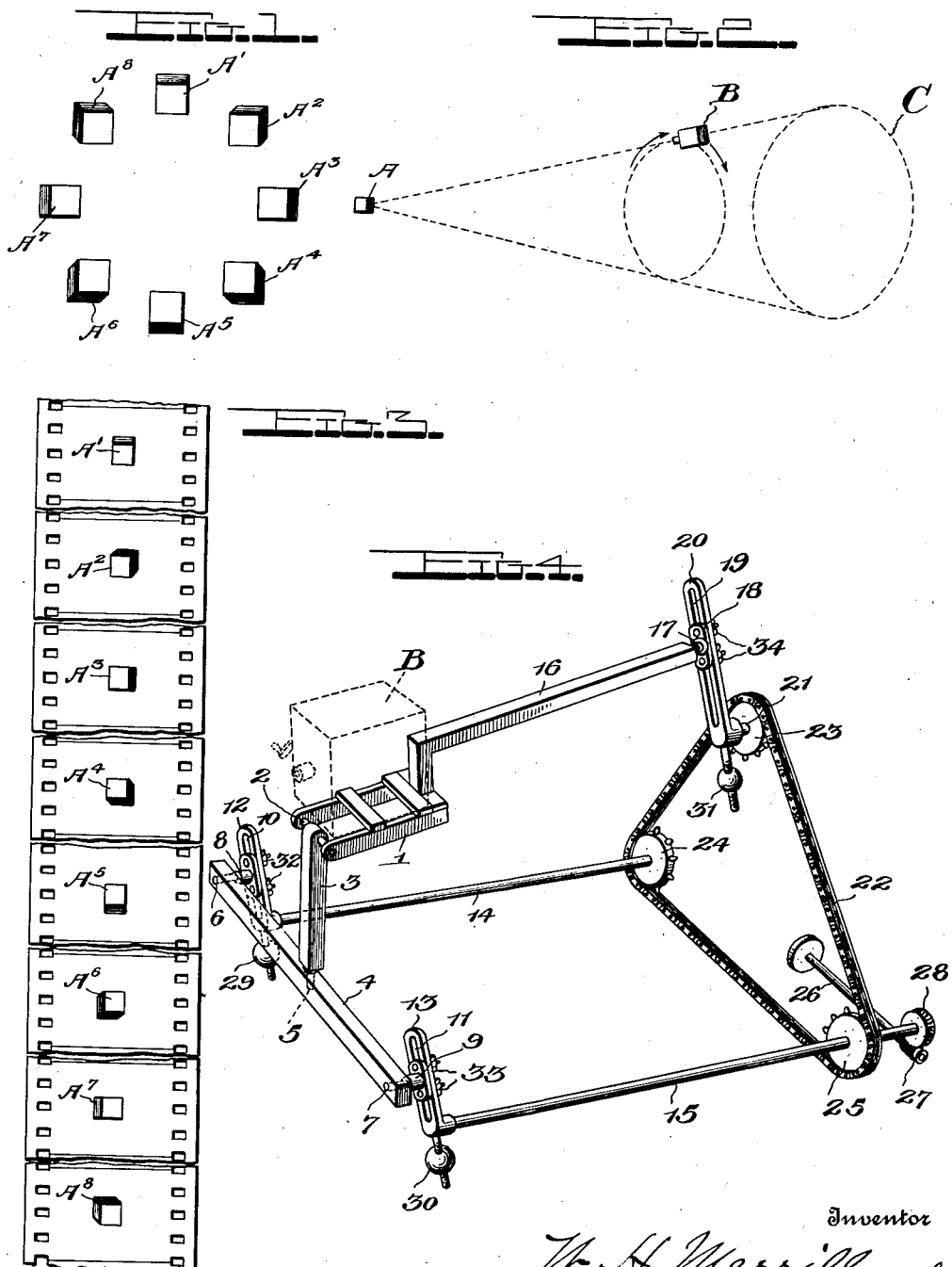

WALTER HIBBARD MERRILL AND THOMAS CHARLES MARTIN, OF WASHINGTON, DISTRICT OF COLUMBIA.

MOTION-PICTURE PHOTOGRAPHY.

1,265,352.  Specification of Letters Patent.  Patented May 7, 1918.

Application filed March 28, 1916. Serial No. 87,262.

*To all whom it may concern:*

Be it known that we, WALTER HIBBARD MERRILL and THOMAS CHARLES MARTIN, citizens of the United States, residing at Washington, District of Columbia, have invented certain new and useful Improvements in Motion-Picture Photography, of which the following is a specification.

If motion picture photographs are taken of a still object with a camera having a single lens (the usual type of motion picture camera) and held stationary, the resulting picture projected on a screen will not be stereoscopic. If, however, the successive pictures present a succession of varying perspectives of the object, the resulting picture projected on the screen will be stereoscopic. Such a result has been effected by employing double lens cameras and taking successive "rights" and "lefts," as they are called, and it has also been sought to effect stereoscopy in pictures taken with one camera having a single lens by moving the camera while taking the pictures, so as to obtain successive perspectives, and we are aware that it has been proposed to move the camera back and forth in the arc of a circle in a horizontal plane while taking such pictures. This method, as well as all others of which we are aware, however, effects stereoscopy in one plane only, with the result that as to some of the objects in the picture, no stereoscopic effect may be perceived. Take, for example, the case of a series of horizontal objects such as telegraph wires. Shifting the camera in a horizontal plane only, would produce no change in perspective in the successive pictures of such objects, and hence no depth or stereoscopy; all of the wires would appear to be in the same plane.

Aside from the fact that a camera moved in a horizontal plane only, takes perspectives varying only in a horizontal plane, the following results are inherent in any arrangement which contemplates the taking of a series of varying perspectives of an object by moving the camera back and forth through the arc of a circle in a horizontal plane, assuming that during the taking of the pictures, the film is kept in continuous motion, and the lens of the camera continuously directed at a fixed point. The number of pictures taken as the camera proceeds from a point at the center of an arc, directly in front of an object, to a point at one of the ends of the arc, will increase as the travel of the camera proceeds, and the degree of the change in perspective will not be uniform, and, near the ends of the excursions of the camera, the perspective will be so small as to be practically inappreciable. Moreover, on account of the reversal of the travel of the camera at the ends of its excursion, a flicker will be caused in the projected picture, due not only to the pausing of the camera, but to the jar which would result at the end of the camera travel in making one of its excursions.

It is proposed by our invention to secure a uniformly varying series of perspectives not only in a horizontal plane, but in a vertical plane, and at as many points between the two as the speed of operation will permit, and to effect this in such a way as to eliminate the flicker above referred to.

In order to more fully describe our invention, reference will be had to the accompanying drawings wherein:

Figures 1 and 2, are theoretical diagrams illustrating the principle of our invention;

Fig. 3, a face view of a moving picture film to illustrate how the objects photographed according to our method would appear on the film, and, Fig. 4, a perspective view of a form of apparatus embodying our invention and which may be employed in carrying out our method.

To illustrate our method, A, Fig. 2, represents an object to be photographed, which for purposes of illustration it will be assumed is a cube, and B, the camera. Our method in this instance is carried out by moving the camera bodily continuously in the direction of the arrows in a circle represented by the dotted line C, said circle lying in a plane at right angles to the axis of a cone the apex of which vanishes at the object, and maintaining the eye of the camera fixed on the object while thus rotated, and during such rotation, operating the camera continuously so as to take a succession of pictures on the film. Such an object would appear, if viewed through the camera, at various positions of the camera 45° apart, as illustrated in Fig. 1, by the perspective views $A^1$ to $A^8$ of the cube, and as actually photographed on the film as shown in Fig. 3. Between these perspectives, which for illustration purposes only are selected 45° apart, there would be many other perspectives of the object, depending in number upon the rate of operation of the camera shutter and its rate of rotation. We therefore see that the object is photographed so as to give horizontal perspective, vertical perspective, and a large number of perspectives, as many as desired, between the two. A film thus prepared and projected on a screen will give what may be called "universal stereoscopy." In other words, all of the objects in the picture will be truly stereoscopic.

Various forms of apparatus may be made for carrying out this method. One form which we have devised and which has proven successful is indicated in Fig. 4, and comprises, among other parts, a supporting frame or bracket 1, upon which rests the motion picture camera B, made rigid thereto in any desired way. This frame is pivotally supported for angular movement vertically upon a rod 2, carried in the upper end of an upright member 3 which is in turn supported by a horizontal bar or member 4 and pivoted thereon as at 5. Bar 4 is supported near its ends upon two pins 6 and 7, respectively, which fit openings in said bar loose enough to permit a relative turning movement between the two. These pins 6 and 7 form projections on two blocks or supporting members 8 and 9 which engage in slots 10 and 11 in two crank arms 12 and 13 respectively, fast on two driving shafts 14 and 15. Extending rearwardly from the camera supporting frame 1, is an arm or extension 16, rigidly secured at one end to said frame and flexibly connected through a ball and socket joint 17 to a block 18 adjustable in a slot 19 extending longitudinally of a crank arm 20 fast to a driving shaft 21. Shafts 14, 15 and 21 are all geared together by a chain 22 running on sprockets 23, 24 and 25, fast respectively on shafts 14, 15 and 21. These sprockets are so chosen that all said shafts will be driven at the same speed. Power to drive said shafts may be derived from a shaft 26 driven from any suitable source of power and geared to shaft 15 through worm gearing 27, 28 or otherwise.

The crank arms 12, 13 and 20 are provided respectively with counter-weights 29, 30 and 31, to prevent vibration.

The blocks 8, 9 and 18, when adjusted to the proper positions may be clamped rigidly to their cranks by thumb screws 32, 33, and 34.

It will be observed that the supporting frame 1 is depressed or occupies a lower position than arm 16. This is to permit the lens of the camera to occupy a position in line with arm 16, so that a line drawn from the center of the object focused upon would pass through the center of the lens and coincide with the longitudinal axis of arm 16. The degree of perspective to be obtained is gaged by the difference in the effective throw of cranks 12 and 13 as compared with that of crank 20. In adjusting the effective throw to be given these cranks, the blocks 8 and 9, for example, are set so that the pins 6 and 7 will both describe circles of a given diameter, say four inches; that is, each pin 6, 7 is set two inches off center with respect to shafts 14 and 15, and block 18 is so set that the ball and socket joint 17 will be offset with respect to shaft 21 to a greater extent, depending upon the distance of the object and the degree of perspective desired. Before the blocks 8, 9 and 18 are thus adjusted, however, they are all slid to the inner ends of their respective slots and the camera focused on the object.

The supporting structure or stationary frame in which shafts 14, 15 and 21 are mounted has been omitted from the drawings for the sake of clearness.

It should be understood that we do not limit our invention to the specific embodiment thereof herein shown and described.

What we claim is:—

1. The method of producing on a film of a motion picture camera a succession of differing perspectives of an object, for rendering the photograph stereoscopic when projected on a screen, which consists in photographing the object from a succession of differing angular positions in four different quadrants of a circle in a plane transverse to the principal axis of the camera lens.

2. The method of producing on a film of a motion picture camera a succession of differing perspectives of an object for rendering the photograph stereoscopic when projected on a screen, which consists in imparting motion to the camera in a curved path and always in the same direction of rotation in a plane transverse to the principal axis of the camera lens, maintaining the lens of said camera directed at a fixed point, and operating the camera to photograph the object in various positions brought about by said movement.

3. The method of producing on a film of a motion picture camera images for rendering the photograph stereoscopic when projected on a screen, which consists in imparting motion to a camera in a closed curved path in a plane transverse to the principal axis of the camera lens, and operating the camera to photograph objects from various positions brought about by said movement.

4. The method of producing on a film of a motion picture camera a succession of differing perspectives of an object for rendering the photograph stereoscopic when projected on a screen, which consists in imparting continuous motion to a camera in a circular path in a vertical plane and always in the same direction of rotation, maintaining the lens of said camera directed at a fixed point, and operating the camera to photograph the object in various angular positions brought about by said movement.

5. The method of producing on a film of a motion picture camera a succession of differing perspectives of an object for rendering the photograph stereoscopic when projected on a screen, which consists in imparting continuous motion to the camera in a circular path and always in the same direction of rotation in a vertical plane, with the lens of said camera directed at a fixed point, in such manner that a line drawn from said point to the center of the camera lens would describe the surface of a cone, and operating the camera to photograph the object in various positions brought about by said movement.

6. The method of taking motion pictures which consists in imparting curvilinear motion in a closed path to the forward end of a camera and simultaneously a similar motion in a closed path of greater length to the rear or opposite end of said camera.

7. The combination with two members adapted to travel respectively in two closed curved paths, one of which is of greater length than the other, of motion transmitting means connected to said members, and a motion picture camera attached to said motion transmitting means whereby the forward portion of said camera may be moved in a closed path and the rear of said camera in another closed path simultaneously, and means to impart motion to said two members, substantially for the purpose set forth.

8. The combination with two rotary supports, of a member connected to each to be driven thereby, a motion picture camera supported forwardly by said member, a rotary support adapted to travel in a path larger than that of the first mentioned supports and connected to said camera rearwardly thereof, and mechanism to impart continuous rotary motion to said supports simultaneously and all in the same direction, substantially for the purpose set forth.

9. The combination with a motion picture camera, of two cranks, a bar connected to each of said cranks and at equal distances from their centers of rotation, a supporting member attached to said bar, a frame for supporting said camera, hingedly connected to said supporting member, a third crank, a member connecting said camera supporting frame to said last named crank at a greater distance from its center of rotation than from the centers of the first named cranks to their points of connection with said bar, and mechanism to impart rotary motion to all said cranks simultaneously and in the same direction, substantially for the purposes set forth.

10. The combination with a motion picture camera, of rotating mechanism, and means to flexibly connect said camera to said mechanism to move said camera bodily in a closed curvilinear path, substantially for the purpose set forth.

11. A motion picture photographic film, having thereon a series of images showing various phases of perspectives of an object and taken from a succession of positions in a closed curve in a plane transverse to the principal axis of the camera lens.

12. The method of producing on a film of a motion picture camera a succession of differing perspectives of an object which consists in photographing the object from a succession of differing angular position in four differing quadrants of a circle in a plane transverse to the principal axis of the camera lens.

13. The method of producing on the film of a motion picture camera images having depth or relief when projected on a screen, which consists in imparting motion to the camera in a curved path in a plane transverse to the principal axis of the camera lens in such manner as to produce on said film a succession of changes in combined horizontal and vertical perspectives, and operating the camera to photograph objects from the various positions brought about by said motion.

14. A motion picture photographic film having thereon a series of images showing successive variations in combined horizontal and vertical perspectives.

15. A motion picture photographic film having thereon a group of images presenting combined vertical and horizontal perspectives, the groups repeated in succession, and a perspective of the last image of one group being immediately followed by an image having the same perspective as the first image of the preceding group.

In testimony whereof we affix our signatures in the presence of a witness.

WALTER HIBBARD MERRILL.
THOMAS CHARLES MARTIN.

Witness:
FRANCIS S. MAGUIRE.